(12) United States Patent
Auslander et al.

(10) Patent No.: US 7,141,103 B2
(45) Date of Patent: *Nov. 28, 2006

(54) PHOTOSENSITIVE OPTICALLY VARIABLE INK COMPOSITIONS USEFUL FOR INK JET PRINTING

(75) Inventors: Judith D. Auslander, Westport, CT (US); Mike Y. R. Chen, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/873,319

(22) Filed: Jun. 22, 2004

(65) Prior Publication Data

US 2005/0279249 A1    Dec. 22, 2005

(51) Int. Cl.
*C09D 11/02* (2006.01)

(52) U.S. Cl. .............................. 106/31.32; 106/31.64; 106/31.28

(58) Field of Classification Search ............. 106/31.32, 106/31.64, 31.28
See application file for complete search history.

(56) References Cited

U.S. PATENT DOCUMENTS

| | | | |
|---|---|---|---|
| 4,015,131 A | 3/1977 | McDonough et al. | |
| 4,705,567 A | 11/1987 | Hair et al. | |
| 5,084,205 A | 1/1992 | Auslander | |
| 5,114,478 A | 5/1992 | Auslander et al. | |
| 5,135,569 A | 8/1992 | Mathias | |
| 5,145,518 A * | 9/1992 | Winnik et al. | 523/161 |
| 5,231,135 A | 7/1993 | Machell et al. | |
| 5,294,664 A * | 3/1994 | Morrison et al. | 524/560 |
| 5,310,887 A | 5/1994 | Moore et al. | |
| 5,331,097 A | 7/1994 | Gunnell et al. | |
| 5,502,304 A * | 3/1996 | Berson et al. | 250/271 |
| 5,514,860 A | 5/1996 | Berson | |
| 5,525,798 A | 6/1996 | Berson et al. | |
| 5,554,842 A | 9/1996 | Connell et al. | |
| 5,569,317 A * | 10/1996 | Sarada et al. | 524/111 |
| 5,626,654 A | 5/1997 | Breton et al. | |
| 5,681,381 A | 10/1997 | Auslander et al. | |
| 5,766,324 A * | 6/1998 | Ikegaya et al. | 106/31.15 |
| 5,877,235 A | 3/1999 | Sakuma et al. | |
| 5,907,342 A * | 5/1999 | Sakaki et al. | 347/105 |

(Continued)

FOREIGN PATENT DOCUMENTS

EP    0344379    9/1988

(Continued)

*Primary Examiner*—J. A. Lorengo
*Assistant Examiner*—Veronica Faison-Gee
(74) *Attorney, Agent, or Firm*—Ronald Reichman; Angelo N. Chaclas

(57) ABSTRACT

New photosensitive optically variable inks are capable of printing images having improved resistance to water. The inks produce images which can be viewed with both visible and ultraviolet light to have physically coincident positive and negative images. They contain at least two types of colorants and other suitable ingredients to enable preparation for printing. The first colorant comprises a fluorescent dye emitting light within a characteristic emission band when excited by fluorescent-exciting radiation. The second colorant, which comprises a colloidal pigment alone or with a dye, has a light absorption band at longer wavelengths than the characteristic emission band of the first colorant or overlapping the emission wavelength of the first colorant, effectively to result in a dark color. The composition also contains an aqueous liquid vehicle comprising water and a water-soluble vehicle in sufficient amounts to achieve an ink viscosity and surface tension effective for application of the ink to a substrate in a predetermined pattern by ink jet printing.

17 Claims, 1 Drawing Sheet

102

104

U.S. PATENT DOCUMENTS

| | | |
|---|---|---|
| 6,039,257 A | 3/2000 | Berson et al. |
| 6,063,175 A | 5/2000 | Harris |
| 6,079,327 A | 6/2000 | Sarada |
| 6,083,310 A | 7/2000 | Peterson et al. |
| 6,142,380 A | 11/2000 | Sansone et al. |
| 6,143,807 A | 11/2000 | Lin et al. |
| 6,157,919 A | 12/2000 | Cordery et al. |
| 6,169,185 B1 | 1/2001 | Likavec et al. |
| 6,174,938 B1 | 1/2001 | Miller et al. |
| 6,176,908 B1 * | 1/2001 | Bauer et al. ............ 106/31.15 |
| 6,200,762 B1 * | 3/2001 | Zlokarnik et al. ........... 435/7.1 |
| 6,494,943 B1 | 12/2002 | Yu et al. |
| 2002/0195586 A1 | 12/2002 | Auslander et al. |
| 2003/0005303 A1 | 1/2003 | Auslander et al. |
| 2003/0041774 A1 | 3/2003 | Auslander et al. |

FOREIGN PATENT DOCUMENTS

| | | |
|---|---|---|
| EP | 1024182 A1 | 8/2000 |
| EP | 1046687 A1 | 10/2000 |
| GB | 2240947 A | 8/1991 |

* cited by examiner

PHOTOSENSITIVE OPTICALLY VARIABLE INK COMPOSITIONS USEFUL FOR INK JET PRINTING

CROSS REFERENCE TO RELATED APPLICATIONS

This matter is related to U.S. Pat. No. 6,793,723, entitled "Homogeneous Photosensitive Optically Variable Ink Compositions for inkjet printing", and U.S. Pat. No. 6,827,769, entitled "Photosensitive Optically Variable Ink Heterogeneous Compositions for inkjet printing", both assigned to the assignee of the present invention.

BACKGROUND OF THE INVENTION

The invention relates to new photosensitive optically variable (POV) inks, and more particularly, to partially water soluble POV inks capable of printing images having improved resistance to water. The inks provided by the present invention are distinct from both the heterogeneous inks of U.S. Patent Publication No. 2003/0041774 and the homogeneous inks described in U.S. Patent Publication No. 2002/0195586. As with the inks described therein, the inks of the invention can produce images which can be viewed with both visible and ultraviolet light to have physically coincident positive and negative images. The inks of the invention, however, are different chemically, physically and functionally.

The POV inks of the invention and those identified above are effective for use with inkjet printing and have a range of applications. They are suitable for producing security markings, which set them apart from other inks. However, because inkjet inks preferably have good water solubility to enable the formation of stable solutions as an ink and discharged from the inkjet printer without separation, the tendency is to produce prints of poor water-fastness. These inks present a significant challenge in providing solution stability and water-fastness in the same ink. It would be desirable to provide inkjet inks having apparently mutually exclusive properties of good operability for the ink and high water-fastness, for the visible print and the fluorescent image.

The inks of the invention are photosensitive optically variable, meaning that they can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems. These inks will achieve acceptable PCS (Print Contrast Signal) on virtually all conventional substrates, including dark papers such as Kraft or Manila. These inks can be used with automated detectors of various types of information-bearing tickets, tags, labels, postage indicia and similar security markings. It would be an advantage if inks suitable for these purposes could have good water fastness. The term PCS is defined as the ratio of the Print Reflectance Difference (PRD) and the substrate reflectance, and the PRD is the difference between the paper reflectance and ink reflectance.

The inks of the invention can be used for fluorescent security marking using automated detectors. Such detectors are known that are responsive to reflected visible light and fluorescent emissions from security markings resulting from excitation at a shorter wavelength such as ultraviolet (UV) excitation. Most detectors do not verify that the fluorescence and the indicium image are physically coincident, thus limiting the ability of the detector to verify the authenticity of the security marking. The subject inks are, however, capable of forming physically coincident fluorescent and visible images. And, because the inks are also capable of inkjet printing for the provision of easily variable information, they form a very small class of inks adapted for fluorescent security marking that can be implemented with high speed on a wide variety of substrates to provide easily variable security markings capable of high speed verification.

The inks of the invention are eminently suitable for "fluorescent security markings" in that they can provide security markings that fluoresce in a defined region of the spectrum upon exposure to a shorter wavelength excitation light such as UV light. The shift in wavelength between the incident excitation light and the fluorescent emission clearly distinguishes fluorescence from direct reflection. The images are capable of red-fluorescence, which means that they fluoresce in the red region of the spectrum. The POV inks of the invention provide fluorescent security markings that are coincident with visible images, making them very difficult to detect and copy, especially where the inks are subject to controls restricting their availability. Their unique compositions are not readily detectable by a person intending to counterfeit, but will preferably be capable of providing unique "fingerprints" that can be identified and traced forensically.

When an original POV security marking is illuminated with visible light, the image is dark against the relatively bright background of the substrate. When the original security marking image is illuminated with the ultraviolet light source, the image is bright against the low fluorescence background of the paper. Similarly, a copied security marking illuminated with visible light appears dark against a light background. As distinguished from the properties of an image of an original security marking under ultraviolet illumination, a copied security marking printed on a fluorescent background or overprinted with fluorescent material and illuminated with ultraviolet light will show a dark image against the bright fluorescent background.

There is a need for additional POV inks that provide effective security, with unique compositions to yet further enhance the provision of security systems having customizable and traceable properties, and especially inks of this type with improved waterfastness.

SUMMARY OF THE INVENTION

It is an object of invention to provide new photosensitive optically variable inks.

It is another object of invention to provide new photosensitive optically variable inks having improved water-fastness.

It is an object of the invention to provide new inks effective for security marking.

It is another object of invention to provide security inks having unique optical and physical penetration properties to enhance their use in providing unique fingerprints that can be identified and traced forensically.

It is another object of invention to provide a new type of POV ink, which can be printed with inkjet printing, yet have good water-fastness.

It is another object of invention to provide inkjet inks having apparently mutually exclusive properties of good operability for the ink and high water fastness for the print.

It is another object of invention to provide a new type of POV ink, having unique optical and physical penetration properties to enhance their use in providing unique fingerprints that can be identified and traced forensically, which can be printed on a wide variety of paper textures and colors by inkjet printing to provide easily variable information within the marking.

These and other objects are accomplished by the invention, which provides ink compositions, processes for using them and the resulting products.

The inks of the invention are aqueous and capable of producing dark, machine-readable markings exhibiting fluorescence when exposed to fluorescent-exciting radiation, and are of suitable viscosity and surface tension for use in ink jet printing. They comprise: (a) a first colorant comprising a fluorescent dye emitting light within a characteristic emission band when excited by fluorescent-exciting radiation; (b) a second colorant comprising a colloidal pigment alone or with a dye, the second colorant having a light absorption band at longer wavelengths than the characteristic emission band of the first colorant or overlapping the emission wavelength of the first colorant, effectively to result in a dark color, preferably black, and (c) an aqueous liquid vehicle comprising water and a water-soluble vehicle in sufficient amounts to achieve an ink viscosity and surface tension effective for application of the ink to a substrate in a predetermined pattern by ink jet printing.

The process of the invention comprises: printing an image having visible and fluorescent components by providing an inkjet printer with an ink as described, and printing an image with the ink on a suitable substrate.

The inks of the invention and the processes for using them, as well as the resulting products, have a number of preferred aspects, many of which are described below and shown in the accompanying drawings.

BRIEF DESCRIPTION OF THE DRAWINGS

The invention will be better understood and its advantages will become more apparent from the following description, especially when read in light of the accompanying drawing, wherein.

DETAILED DESCRIPTION OF THE INVENTION

Figure 1:
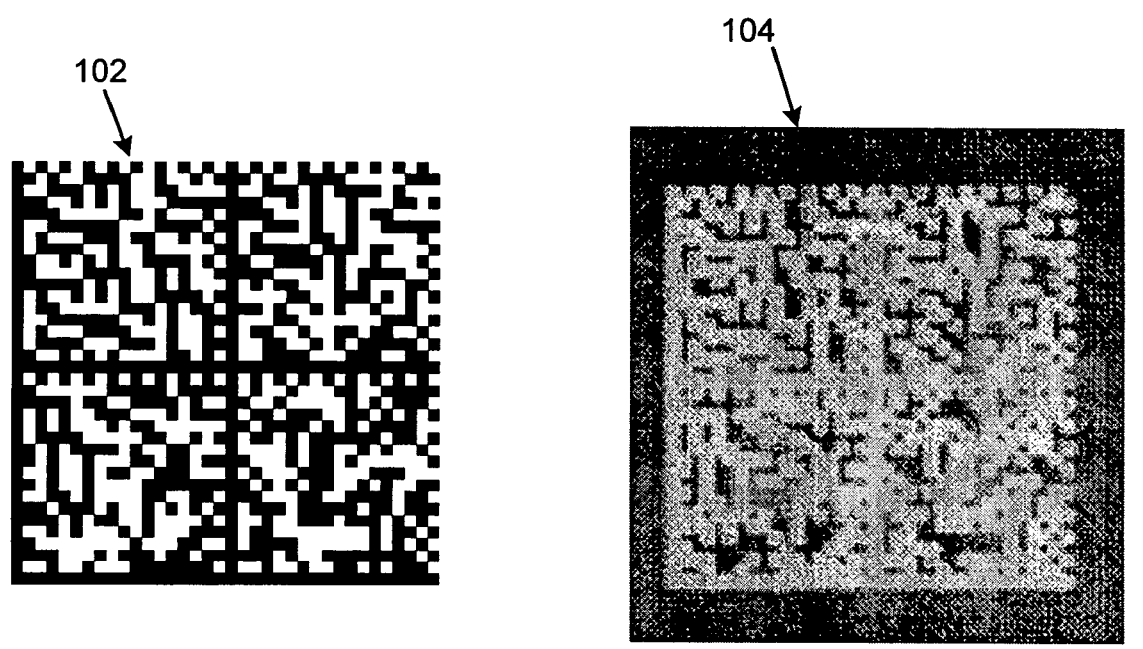
FIG. 1 illustrates both visible and fluorescent images enabled by printing the inks of the invention on a substrate, one of a printed substrate in reflection under illumination by visible light and one of the same printed substrate fluorescing under ultraviolet excitation.

The invention relates to new photosensitive optically variable (POV) inks capable of printing images by various printing means, including inkjet printing. The new inks are distinct from both the heterogeneous inks of U.S. Patent Publication No. 2003/0041774 and the homogeneous inks described in U.S. Patent Publication No. 2002/0195586. As with the inks described therein, the inks of the invention can produce images that can be viewed with both visible and ultraviolet light to have physically coincident positive and negative images. The inks of the invention, however, are different chemically, physically and functionally, and in particular have improved resistance to water.

The inks of this invention are utilized in a number of ink jet printing operations, giving visible dark and fluorescent images. FIG. 1 illustrates both visible and fluorescent images enabled by printing the inks of the invention on a substrate, one of a printed substrate in reflection under illumination by visible light and one of the same printed substrate fluorescing under ultraviolet excitation.

An application of a POV security marking in the field of postage evidencing is a black postage indicium that fluoresces in the red region of the spectrum when illuminated with ultraviolet light. FIG. 1 shows machine-scanned images 102 and 104 of a POV security marking including a Data-Matrix bar code. The image scanned in reflection 102 was obtained by illuminating the marking with visible light. The low reflectance of the black ink results in dark areas of the scanned image corresponding to printed areas of the security marking. The image scanned in fluorescence 104 is obtained by viewing the visible red-fluorescent emissions under ultraviolet (UV) illumination. The scanned image 104 shows that the security marking emits visible light when illuminated with UV light resulting in light areas in the scanned image corresponding to the printed areas. Comparison of images 102 and 104 shows that the fluorescing image is a negative of the reflective image, i.e., there is a strong negative correlation between the two images.

Forensic characteristics are important to value metering applications such as postal payment and to other security applications. Other security applications of fluorescent inks include security papers and documents. Because of the unique penetration characteristics of the new inks, a fluorescent image 104 will remain to a significant detectable extent after the visible dark color is erased or otherwise removed. In this manner, forensic evidence is provided of what was printed.

The POV inks of the invention can be used to produce security markings by digital printing, especially through inkjet printing. They can also be used in other printing technologies. It is an advantage of the invention that the new black fluorescent inks of the invention possess low viscosities applicable in thermal inkjet and yet provide printed images with good water fastness. The new concept of formulation employs red fluorescent dye mixtures with longer wave length absorbing pigments, preferably colloidal blue pigments, alone or with dyes.

For the purposes of the invention, a photosensitive optically variable (POV) ink is an ink that produces a visible, dark print that fluoresces when excited with a shorter wavelength light such as ultraviolet light. The patent publication documents identified in paragraph [0021] above describe POV inks. As used herein, the POV inks of choice will preferably provide a printed image that is visually dark, e.g., black or dark gray, and contains a machine-readable information-bearing marking that fluoresces in a specific wavelength range when excited with a shorter wavelength light. Images printed with POV inks exhibit light absorption throughout the entire visible spectrum including the red region of the visible spectrum where red inks are invisible to typical automatic scanning systems. These inks will achieve acceptable PCS (Print Contrast Signal) on dark papers such as Kraft or Manila as well as on white and light-colored substrates. The Print Contrast Signal (PCS) is the ratio of the Print Reflectance Difference (PRD) and the substrate reflectance. The difference between the paper reflectance and ink reflectance is the PRD. These terms are given their meanings as defined by the USPS.

The inks of the invention will comprise at least two distinct colorant portions to achieve the objectives. A first colorant potion will comprise a fluorescent dye emitting light within a characteristic emission band when excited by fluorescent-exciting radiation. Red fluorescence is preferred. The fluorescent dye will be present in the formulation in concentration effective to provide both a necessary contribution to the visible color of the ink and to provide a machine detectable fluorescent image. Among the suitable fluorescent dyes for the first colorant are those dyes meeting the objectives herein described in U.S. Patent Publication No. 2002/0195586.

The preferred water soluble fluorescent dyes are characterized by red fluorescence and a suitably intense visible color to provide a dark color to the ink in the ink composition. The most preferred of this class have visible colors ranging from red to green and fluoresce by emitting light within the range of from 390 to 680 nm. Preferred yellow or orange fluorescent dye components (FY) may be based on the chromophoric systems such as anionic coumarins, cationic coumarins, anionic naphthalimide dyes, pyranine (anionic pyrene dye), neutral, anionic and cationic perylene dyes, and anionic xanthene dyes. Some preferred yellow or orange fluorescent dyes are anionic coumarines, cationic coumarines, courmarine sulfonic acid, anionic napthalimide, neutral perylene, cationic perylene, anionic pyronine, and anionic napthalimide dyes, as illustrated for example in FIG. 13 of U.S. Patent Publication No. 2002/0195586. Among the useful red and purple fluorescent dyes are anionic xanthene dyes, bispyrromethane boron complexes, cationic and zwitterionic pyronines and sulphorhodamine B (SRB), as illustrated for example in FIG. 14 of U.S. Patent Publication No. 2002/0195586. Acid Red 52 is a suitable water-soluble magenta dye. Acid Red 52 dye has satisfactory solubility in water but a very low water fastness as normally employed. Thus, a disadvantage of the magenta Acid Red 52 dye is that the ink containing such dye bleeds when exposed to water. Also, prints obtained with these inks offset on the back of neighboring envelopes when exposed to water, and the offset prints show an increased fluorescent signal. The dilution of fluorescent imprints on certain envelopes could enhance the fluorescent signal. Therefore, current magenta inks experience background offset fluorescence. This can cause matter that is not an indicia to appear as an actual indicia printed on an envelope. Because the inks of the invention use concentrations of only from about 0.1 to about 2.0%, more narrowly, from 0.25 to 1.0%, by weight of this component in the ink composition as used in the final inks, any loss of definition due to water wetting after printing by inkjet printing is surpassed by the ability of the ink to penetrate the substrate as part of the composition of the invention. Also among the useful yellow and orange dyes are acid yellow 7, coumarin sulfonic acid, cationic coumarins, anionic coumarins, neutral, anionic and cationic perylene dyes, anionic naphthalimide dyes and pyranine dyes. An important feature of these dyes is their ability to form a dark colored ink with good fluorescent properties.

In order to achieve a black ink, the dye and pigment mixture of the invention must absorb across the entire visible spectrum, from 390 nm to ca. 680 nm. To obtain simultaneous red fluorescence in ultraviolet light in the desired region of 580–630 nm, the composition must absorb fluorescence exciting radiation, e.g., UV light, efficiently and fluoresce efficiently, preferably between 580 and 630 nm. The first colorant dye (or dyes) is selected to meet these criteria in combination with the second colorant of the invention which comprises a colloidal pigment alone or with a dye having a light absorption band at longer wavelengths than the characteristic emission band of the first colorant or also overlapping the emission wavelength of the first colorant in such a way as to result in a dark color, preferably black. The second colorant will be present in the formulation in concentration effective to provide a necessary contribution to the visible color of the ink without preventing machine delectability of the fluorescent image. The inks of the invention typically employ the second colorant at concentrations (based on the weight of dry solids) of from about 1 to about 5%, more narrowly, from 2 to 4%, by weight of this second colorant in the ink composition as applied. The dyes and/or pigments will have characteristic penetrations into paper and preferred members of the group will not significantly lose definition due to water wetting after printing by inkjet printing.

Among the colorants suitable for use in the second colorant of the inks of the invention are the water dispersible colloidal pigments, as described, for example, in U.S. Pat. No. 6,494,943 to Yu, et al. The pigments described broadly by the Yu, et al. patent are identified as colored pigments having one or more desired parameters and/or properties are described. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Similarly, the preferred pigments of the invention can be characterized as having one or more of these properties. In addition to these pigments are those that require dispersants to remain stable. Among preferred colloidal pigments are those available from Cabot Corporation as Cabot Blue Pigment Dispersion, Cyan COJ 250 and from Degussa as R-4071 Blue Pigment Dispersion. Pigments like these will not bleed to the extent of dyes, yet in the formulations of the invention will provide a penetration and water fastness highly desirable for security and other value metered markings, as POV inks.

The second colorant will also preferably include an appropriately colored water soluble dye as described, for example, in U.S. Patent Publication No. 2003/0041774. Among these are blue dyes, such as acid and direct dyes purified for ink jet use such as CI Acid Blue 9, Duasyn Blue FRL-SF (Direct Blue 199), Profast Cyan 2 (Direct Blue 307 or any blue dye with an extinction coefficient higher than 10,000 soluble in water. The dye can also be one of the dyes mentioned above, selected to provide a desired color, shade or hue in the visible range, while providing suitable darkness in the printed ink to maintain readability and suitable fluorescence to provide machine readability.

In addition to the described colorants and equivalents, the ink compositions of the invention will contain an aqueous liquid vehicle comprising water and a water-soluble vehicle in sufficient amounts to achieve an ink viscosity and surface tension effective for application of the ink to a substrate in a predetermined pattern by ink jet printing. Typical of these components are those described in the above noted patent publications, which are hereby incorporated by reference. The ink carrier for the colorants used in these ink compositions contain at least 65% water.

Fluorescence stabilizers (FS) can be employed in concentrations effective for maintaining (sometimes by enhancing fluorescence) a constant fluorescence level. Since the fluorescence of low viscosity inks can decrease as the ink penetrates the paper, it is preferred to include an additive effective to help maintain a constant level of fluorescence. The following solvents can provide enhancement of fluorescence: N,N-Dimethylacetamide, sulfolane, formamide, methylphenyl sulfoxide, N-Methylpyrrolidinone, 4-Methylmorpholine-N-oxide (MMNO), dimethylsulfoxide (DMSO), and the like. All of these solvents have the characteristic of a dipolar aprotic solvent with a high dielectric constant (>ca. 20) or high value of Hildebrand solubility parameter ($\delta > 10$ MPa$^{1/2}$).

From this list, the 4 methylmorpholine-N-oxide (MMNO) had the best ability to achieve long term increased fluorescence, has no fluorescence quenching tendency and is a hygroscopic high boiling solid when pure. (It is typically supplied as 50–60% aqueous solution.) The MMNO is a known solvent for cellulose and aids penetration into the fibers of the paper, which may increase the fluorescence in a selective and long lasting manner. Polar low molecular weight resins (PLMWR) are of benefit to enhance and stabilize the fluorescence, in many cases to a lesser extent and by a different mechanism than other FS materials described above. Polar resins such as polyvinylpyrrolidone (e.g., MW 300 to 15000), HVWT resins (e.g., HVWT 10: 5,5-dimethyl hydantion formaldehyde) and polyethyleneglycols are beneficial and their use is preferred. Other water-soluble resins with good solvent characteristics for polar dyes are: polyvinylalcohol, poly N,N-dimethylhydantoin, polyacrylates, etc.

Glycol ethers, such as BTG (Triethylene Glycol Mono Butyl Ether), can have multiple beneficial effects such as: bridging between the water and other organic solvents, enhancing the color and fluorescence by internal hydrogen bonding, and improved penetration into the paper. Possibly the most efficient glycol in preferred forms of the invention is the BTG. Among suitable glycols that could be used are as following: triethylene glycol n-Butyl Ether (BTG), tripropylene glycol methyl ether (TPM), diethylene glycol n-butyl ether (DB), diethylene glycol methyl ether (DM), dipropylene glycol methyl ether (DPM), and the like.

Amines such as triethanol amine, ethanol amine, diethanolamine, trisopropanolamine, butyldiethanolamine, N,N dimethylethanolamine, N,N diethylethanolamine, N,N dipropylethanolamine, and the like can be useful in preventing the aggregation of the dyes, the evaporation during drying as a fugitive counterion and thus providing improved waterfastness as well as for improved solubility in water/glycol/ether mixtures. The amine helps also in maintaining constant viscosity during long periods of rest as well as fluidity and easy redispersibility. In addition, it does not cause clogging of nozzles during printing or at the time of restarting after interruption of printing, thus maintaining high ejection stability.

The ink compositions of the invention are illustrated below in preferred forms and are, in these forms and others, highly effective for ink jet imprinting visible and fluorescent images, both preferably being machine readable. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Desirably, within the spectral range of interest (SROI), e.g., from 390 to 680 nm (visible range), the ink reflectance is less than 50% of the paper reflectance.

The inks of the invention are capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images on a wide variety of substrates.

The inks will contain an aqueous liquid vehicle comprising water and a water-soluble vehicle in sufficient amounts to achieve an ink viscosity and surface tension effective for application of the ink to a substrate in a predetermined pattern by ink jet printing. Viscosities will typically be less than about 15 cps. For thermal ink jet printing, the viscosity should be within the range of from 1 to 5 cps when measured Haake Viscotester at 25° C., preferably from 2 to 4 cps, and exhibit a surface tension of from 20 to about 80 dyne/cm when measured by Fisher Surface Tensiomat at 25° C., preferably from 30 to 50 dyne/cm. For ink jet printing by piezoelectric means, the viscosity should be within the range of from 1.5 to 15 cps when measured by the above method, preferably from 2 to 12 cps.

The inks of the invention should have a visual dark color (neutral black), e.g., with L, a, b values in the range of L=(<57), a=(−5 to 5), b=(−5 to 5) and preferably in the range of L=(,55), a=(−1 to 1), b=(−1 to 1) and a red-fluorescent signal when excited with UV light short or long wavelength. The test methodology for this and other data referred to herein is described, for example, in U.S. Patent Publication No. 2003/0041774. The print contrast signal PCS (also, PCR) is preferably greater than 0.35, for white and kraft papers with the red or green filters, when measured with the Envelope Reflectance Meter from the USPS. For white paper with red filter, values of greater than 0.45 are desired, e.g., 0.48 and above, e.g., 0.48–0.6, and essentially the same values with a green filter. For kraft paper, it is preferably greater than 0.35, e.g., 0.37–0.5 for a green filter and 0.45 and above, e.g., 0.43–0.6, with a red filter.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580–640 nm when excited by UV light. The fluorescent intensity should be at least 7 PMU and for examples is in the range of (39–69) Phosphor Meter Unit (PMU) for solid printed areas and 50 to 98 PMU for drawdowns, the fluorescent component can be carried by the solvent (carrier) into the substrate and provide adequate fluorescent signal intensity.

In preferred forms, and when viewed from a variety of perspectives, the colorants can be selected such that the net effect between fluorescence and quenching by the other components that when dry: after a draw down on white envelope substrate exhibits a fluorescent intensity of 50 to 99+ PMU; after a postage meter imprint is produced with a resolution of 160×480 dots per inch of a solid area on white envelope substrate exhibits a fluorescent intensity of 39 to 69 PMU; after a high resolution printer produces a solid area with a resolution of 1440×720 dots per inch of a solid area on white envelope substrate exhibits a fluorescent intensity of 19 to 39 PMU; after a high resolution printer produces a solid area with a resolution of 1440×720 dots per inch of a solid area on kraft paper substrate exhibits a fluorescent intensity of 19 to 32 PMU; dry after a high resolution printer produces a solid area with a resolution of 1440×720 dots per inch of a solid area on white envelope substrate exhibits a fluorescent w Fluoromax-2 Fluorescent Spectrophotometer of 96,482 to 232,643 counts per second; and after a high resolution printer produces a solid area with a resolution of 1440×720 dots per inch on kraft envelope substrate exhibits fluorescent intensity when measured with a Fluoromax-2 Fluorescent Spectrophotometer of 106,576 to 242,180 counts per second.

It is an additional advantage of the invention that the inks exhibit improved waterfastness. Preferred inks will exhibit improved waterfastness, with Reflectance Ratio values of greater than 2, and preferably of from 3 to 9, and Red Modulation values of greater than 0.65, and preferably of from 0.75 to 0.99, when measured by tests WF-1 and WF-2, as set out in Example 1 below.

The following examples are presented to further illustrate and explain the invention and are not to be taken as limiting in any regard. Unless otherwise indicated, all parts and percentages are by weight.

EXAMPLE 1

This example illustrates an improvement in water fastness for an ink formula of the invention containing a colloidal blue pigment as a component of the second colorant as compared to a similar formulation containing a blue dye. Strong improvements are shown in terms of higher Reflectance ratio and Modulation (RGB).

| Components | Ink with Blue Pigment Wt (%) | Ink with Blue Dye Wt (%) |
|---|---|---|
| Distilled Water | 67.66 | 72.2 |
| Triethanolamine (TEA) | 0.29 | 0.31 |
| 4-methymopholine-N-Oxide (MMNO) | 1.93 | 2.06 |
| 5,5-Dimethyl hydantoin formaldehyde | 5.80 | 6.19 |
| Triethylene Glycol Mono Butyl Ether (BTG) | 2.90 | 3.09 |
| Dodecylbenzene sulphonic acid (DBSA) | 0.48 | 0.52 |
| Glycerol | 6.07 | 6.48 |
| 1,2,4-butanetriol | 3.85 | 4.10 |
| Urea | 1.90 | 2.03 |
| Acid Yellow 7 (Pylam, 500%) | 0.35 | 0.37 |
| Acid Red 52 (Pylam, 400%) | 0.43 | 0.45 |
| Pyranine 120 (Bayer) | 1.11 | 1.19 |
| Degussa R-4071 Blue Pigment Dispersion | 7.23 | — |
| Ink with Millijet Blue Dye 28 | — | 0.99 |
| Total | 100.00 | 100.0 |

Properties of Drawdown and Inks

| | Ink with Blue Pigment | Ink with Blue Dye |
|---|---|---|
| PMU (drawdown) | 82 | 60 |
| OD (drawdown) | 0.67 | 0.67 |
| pH | 7.54 | 7.43 |
| Viscosity (cp) | 2.11 | 2.19 |

Comparison of Water Fastness for Inks with Blue Pigment and Dye

| | Ink with Blue Pigment | Ink with Blue Dye |
|---|---|---|
| *Reflectance Ratio | 7 | 2 |
| **Modulation R | 0.96 | 0.63 |
| **Modulation G | 0.78 | 0.65 |
| **Modulation B | 0.76 | 0.73 |

*Reflectance Ratio values in the above table were obtained using a test we identify as WF-1, performed according to the following procedure:

1. Epson C82 printer was used to print sample using Type A Envelope.
2. Reflectance was measured for printed area and paper using Macbeth PCM with filter A, and values are recorded as $R_{ink\ initial}$ and $R_{paper}$, respectively.
3. Printed sample with a solid area was soaked in distilled water for 5 minutes, taken out, and dried.
4. Reflectance was measured for printed solid area after soaking, and value is recorded as $R_{ink\ final}$.
5. Reflectance ratio was calculated based the equation: Ratio = $(R_{paper} - R_{ink\ final})/(R_{paper} - R_{ink\ initial}) * 10$]. Example: R = [(85 − 34)/(85 − 16)] * 10 = 7.4
6. The ratio scale from 0 to 10. Ratio of 10 is best, No effect.

**Modulation values in the above table were obtained using a test we identify as WF-2, performed according to the following procedure:
1. Prepare a test pattern with three evenly separated solid bars using Epson C82 printer with normal printing quality.
2. Measure the C- M- Y- values for nine positions of printed bars and unprinted paper blow the corresponded bar area using X-Rite 504 Spectrodensitometer (D65 illumination at 10° observer), and calculated the R, G-, and B- values, and record as $R_{ink,\ before}$ and $R_{paper,before}$ respectively.
3. Run a small volume of water (100 μl) over the printed pattern at nice different positions, and let pattern dry at room temperature.
4. Measure the same positions as Step 2 after pattern was wetted with water and dry, and record as $R_{ink,\ after}$ and $R_{paper,after}$, respectively.
5. The averages of R-, G-, B- values for nine positions for both printed bar and unprinted paper are obtained, and Modulation is calculated for R, G, and B, respectively based on the following equation.
Modulation = $(R_{paper,after} - R_{ink,after})/(R_{paper,\ before} - R_{ink,\ before})$, where
$R_{paper,after}$: Minimum reflectance for paper;
$R_{ink,after}$: Maximum reflectance for ink;
$R_{paper,\ before}$: Maximum reflectance for paper;
$R_{ink,\ before}$: Minimum reflectance for ink.

EXAMPLE 2

Another ink according to the invention was prepared from the following materials:

| Components | Wt (%) |
|---|---|
| Distilled Water | 70.0 |
| Triethanolamine (TEA) | 0.30 |
| 4-methylmorpholine-N-oxide (MMNO) | 1.86 |
| HVWT 10 5,5-Dimethyl hydantoin formaldehyde | 6.00 |
| Triethylene Glycol Mono Butyl Ether (BTG) | 3.81 |
| Glycerol | 4.77 |
| 1,2,4-butanetriol | 4.11 |
| Acid Yellow 7 (Pylam, 500%) | 0.36 |
| Acid Red 52 (Pylam, 400%) | 0.44 |
| Pyranine 120 (Bayer) | 1.15 |
| Degussa R-4071 Blue Pigment Dispersion | 7.20 |
| Total | 100.0 |

An ink prepared from the above was tested both as a drawdown and as printed on a GEM ink jet printer. The results are shown in the table directly following:

| Properties of I Drawdown/Print (GEM) | |
|---|---|
| PMU (drawdown) | 74 |
| OD (drawdown) | 0.67 |
| PMU (Eagle area) | 9 |
| PMU (Indicia) | 21 |
| OD (Solid Area) | 0.65 |

The ink was then tested for its physical properties important to ink jet printing, with the following results:

| Properties of Ink | |
|---|---|
| PH | 7.54 |
| Viscosity (cp) | 2.1 |
| Surface Tension (Dyne/cm) | 41.5 |

EXAMPLE 3

Another ink according to the invention was prepared from the following materials:

| Components | Wt (%) |
|---|---|
| H₂O | 54.14 |
| Fluorescent Dye, Acid Yellow 7 (International Color Index or C.I. 56295) | 0.40 |
| Fluorescent Dye, Acid Red 52 (magenta dye) | 0.55 |
| Anionic Surfactant, dodecylbenzene sulfonic acid (DBSA) | 1.00 |
| Pyranine120 dye | 1.40 |
| 4-methylmorpholine-N-oxide (MMNO) | 2.00 |
| Triethylene Glycol Mono Butyl Ether (BTG) | 6.00 |
| Polyvinylpyrrolidone (PVP) | 6.00 |
| Dark Pigment, (10% solids dispersed in water) Cabot Blue Pigment Dispersion, Cyan COJ 250 (PB 15:4) | 28.12 |
| Surfactant, TEA (triethylamine) | 0.40 |
| Total | 100.00 |

The ink so prepared was tested by printing with the following results: 15PMU (Datamatrix A, B Envelope printed with HP1600C @ 300×600 DPI).

EXAMPLE 4

Another ink according to the invention was prepared from the following materials:

| Components | Wt (%) |
|---|---|
| Distilled Water | 66.13 |
| Triethanolamine (TEA) | 0.35 |
| MMNO | 2.20 |
| PVP K12 | 5.04 |
| Triethylene Glycol Mono Butyl Ether (BTG) | 3.90 |
| DBSA | 0.99 |
| Acid Yellow 7 (Pylam, 500%) | 0.269 |
| Acid Red 52 (Pylam, 400%) | 0.415 |
| Pyranine 120 (Bayer) | 1.334 |
| Cabot Blue (IJX558) | 19.37 |
| Total | 100.0 |
| Properties of Ink Drawdown | |
| PMU (drawdown) | 66 |
| OD (drawdown) | 0.69 |
| Properties of Print (printed by GEM meter) | |
| PMU (Eagle area) | 3 |
| PMU (Indicia) | 16 |
| OD (Solid Area) | 0.62 |
| Physical Properties of Ink | |
| PH | — |
| Viscosity (cp) | 2.06 |
| Surface Tension (Dynes/cm) | — |

EXAMPLE 5

Another ink according to the invention was prepared from the following materials:

| Components | Wt (%) |
|---|---|
| Distilled Water | 78.44 |
| Triethanolamine (TEA) | 0.41 |
| MMNO | 2.57 |
| PVP K12 | 5.89 |
| Triethylene Glycol Mono Butyl Ether (BTG) | 4.56 |
| Acid Yellow 7 (Pylam, 500%) | 0.314 |
| Acid Red 52 (Pylam, 400%) | 0.485 |
| Pyranine 120 (Bayer) | 1.559 |
| Acryjet Cyan 157 Dispersion | 5.78 |
| Total | 100.0 |
| Properties of Drawdown | |
| PMU (drawdown) | 55 |
| OD (drawdown) | 0.70 |
| Properties of Print (printed by GEM meter) | |
| PMU (Eagle area) | 4 |
| PMU (Indicia) | 15 |
| OD (Solid Area) | 0.60 |
| Physical Properties of Ink | |
| PH | — |
| Viscosity (cp) | 2.19 |
| Surface Tension (Dynes/cm) | — |

EXAMPLE 6

A series of inks is prepared to compare two preferred formulations according to the invention with an ink not containing a water soluble resin in the formulation. The inks were prepared to have the following formulations and were tested to show the effect of a preferred effect of a water soluble resin component on fluorescence.

| Components | Control (without Resin) Wt (%) | With HVWT 5,5-Dimethyl hydantoin formaldehyde Wt (%) | with PVP Wt (%) |
|---|---|---|---|
| Distilled Water | 76.0 | 70.0 | 70.0 |
| Triethanolamine (TEA) | 0.30 | 0.30 | 0.30 |
| 4-methymopholine-N-Oxide (MMNO) | 1.85 | 1.85 | 1.85 |
| 5,5-Dimethyl hydantoin formaldehyde | — | 5.97 | — |
| Polyvinylpyrrolidon (PVP), K12 (MW: 3500) | — | — | 5.97 |
| Triethylene Glycol Mono Butyl Ether (BTG) | 3.79 | 3.79 | 3.79 |
| Glycerol | 4.75 | 4.75 | 4.75 |
| 1,2,4-butanetriol | 4.09 | 4.09 | 4.09 |
| Acid Yellow 7 (Pylam, 500%) | 0.36 | 0.36 | 0.36 |
| Acid Red 52 (Pylam, 400%) | 0.44 | 0.44 | 0.44 |
| Pyranine 120 (Bayer) | 1.14 | 1.14 | 1.14 |
| Degussa R-4071 Blue Pigment Dispersion | 7.17 | 7.17 | 7.17 |
| Total | 100 | 100 | 100 |

Drawdowns of the above formulations were made using Type A envelope (see reference below for envelope properties).

|  | Control (without Resin) | with HVWT | with PVP |
| --- | --- | --- | --- |
| PMU (drawdown) | 63 | 73 | 68 |
| OD (drawdown) | 0.67 | 0.67 | 0.68 |

The results show that:

An addition of 6% 5,5-Dimethyl hydantoin formaldehyde enhanced PUM of drawdown by 10-unit, comparing drawdowns at the same optical density of 0.67.

An addition of 6% PVP enhanced PUM of drawdown by 5-unit with slightly higher optical density (0.68 vs. 0.67 for ink without PVP).

Envelope Properties Reference:

Properties of Type A Envelope

| Envelope Type | A | Notes |
| --- | --- | --- |
| Description | Single White Wove | Envelope (ID: 210116) was conditioned at 20° C., 69% RH before testing |
| Color, L | 94.37 | Obtained by Labsphere BFC-450 Spectrophotometer (CIE 1964, D65, 10 degree) |
| Color, a | 1.19 | |
| Color, b | −1.46 | |
| Whiteness (CIE) | 92.79 | Obtained with Labsphere BFC-450 |
| Tint (CIE) | −1.29 | Obtained with Labsphere BFC-450 |
| Brightness (R457) | 86.16% | Obtained with Labsphere BFC-450 |
| Brightness (R457), contributed by optical brightener | 1.53% | Obtained with Labsphere BFC-450 |
| Optical Density | 0.08 | Tested by X-Rite AS400 densitometer |
| Porosity (Sheffield) | 148 | Obtained with TMI Smoothness tester |
| Smoothness (Sheffield) | 175 | Obtained with TMI Smoothness tester |
| Thickness (Mils), 1 mil = 0.001" | 5.1 | Obtained with TMI model 49–70 |
| Penetration Time (sec.) | 9.42 | Average of 6 readings, time for a 1 µl water to penetrate into the paper |
| Cobb Sizing | 140 | Based on TAPPI 441 om-90 |
| PH | 8.58 | Tested by an Orion 920 pH meter |

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. An aqueous ink capable of producing dark, machine-readable markings exhibiting fluorescence when exposed to fluorescent-exciting radiation, said ink being of suitable viscosity and surface tension for use in ink jet printing, comprising:

(a) a first colorant comprising a fluorescent dye emitting light within a characteristic emission band when excited by fluorescent-exciting radiation;

(b) a second colorant comprising a blue colloidal pigment alone or with a dye, the second colorant having a light absorption band at longer wavelengths than the characteristic emission band of the first colorant or overlapping the emission wavelength of the first colorant, effectively to result in a dark color, preferably black, and (c) an aqueous liquid vehicle comprising water and a water-soluble vehicle in sufficient amounts to achieve an ink viscosity and surface tension effective for application of the ink to a substrate in a predetermined pattern by ink jet printing.

2. An ink according to claim 1 which exhibits waterfastness Reflectance Ratio values of greater than 2 and Modulation (RGB) values of greater than 0.65, when measured by tests WF-1 and WF-2.

3. An ink according to claim 1, which further includes a water soluble resin.

4. An ink according to claim 3, wherein the water soluble resin is selected from the group of polyvinylpyrrolidone and 5,5-Dimethyl hydantoin formaldehyde.

5. An ink according to claim 1 wherein the colorants are selected such that an image when dry after a draw down on white envelope substrate exhibits a fluorescent intensity of 50 to 99+ PMU.

6. An ink according to claim 1 which exhibits a viscosity of less than 15 cps.

7. An ink according to claim 1 wherein a print exhibits a print contrast signal PCS of greater than 0.35, for white and kraft papers with the red or green filters, when measured with the Envelope Reflectance Meter from the USPS.

8. An aqueous ink capable of producing dark, machine-readable markings exhibiting fluorescence when exposed to fluorescent-exciting radiation, said ink being of suitable viscosity and surface tension for use in ink jet printing, comprising:

(d) a first colorant comprising a fluorescent dye emitting light within a characteristic emission band when excited by fluorescent-exciting radiation;

(e) a second colorant comprising a blue colloidal pigment alone or with a dye, the second colorant having a light absorption band at longer wavelengths than the characteristic emission band of the first colorant or overlapping the emission wavelength of the first colorant, effectively to result in a dark color, preferably black, and (f) an aqueous liquid vehicle comprising water, a water soluble resin, and a water-soluble vehicle in sufficient amounts to achieve an ink viscosity and surface tension effective for application of the ink to a substrate in a predetermined pattern by ink jet printing;

said ink exhibiting waterfastness Reflectance Ratio values of greater than 2 and Red Modulation values of greater than 0.65, when measured by tests WF-1 and WF-2.

9. An ink according to claim 8, wherein the water soluble resin is selected from the group of polyvinylpyrrolidone and 5,5-Dimethyl hydantoin formaldehyde.

10. An ink according to claim 8 wherein the colorants are selected such that an image when dry after a draw down on white envelope substrate exhibits a fluorescent intensity of 50 to 99+ PMU.

11. An ink according to claim 8 which exhibits a viscosity of less than 15 cps.

12. An ink according to claim 8 wherein a print exhibits a print contrast signal PCS of greater than 0.35, for white and kraft papers with the red or green filters, when measured with the Envelope Reflectance Meter from the USPS.

13. A process for printing a security marking comprising:
providing an ink comprising (a) a first colorant comprising a fluorescent dye emitting light within a characteristic emission band when excited by fluorescent-exciting radiation, (b) a second colorant comprising a blue colloidal pigment alone or with a dye, the second colorant having a light absorption band at longer wavelengths than the characteristic emission band of the first colorant or overlapping the emission wavelength of the first colorant, effectively to result in a dark color, preferably black, and (c) an aqueous liquid vehicle comprising water and a water-soluble vehicle in sufficient amounts to achieve an ink viscosity and surface tension effective for application of the ink to a substrate in a predetermined pattern by ink jet printing:
printing an image with said ink.

14. A process according to claim 13, wherein the ink exhibits waterfastness Reflectance Ratio values of greater than 2 and Red Modulation values of greater than 0.65, when measured by tests WF-1 and WF-2.

15. A process according to claim 13, wherein the ink further includes a water soluble resin.

16. A process according to claim 15, wherein the water soluble resin is selected from the group of polyvinylpyrrolidone and 5,5-Dimethyl hydantoin formaldehyde.

17. A product prepared according to the process of claim 13.

* * * * *